Patented Oct. 17, 1922.

1,432,374

UNITED STATES PATENT OFFICE.

WILLIAM R. WEBB, OF ROCHESTER, NEW YORK, ASSIGNOR TO EASTMAN KODAK COMPANY, OF ROCHESTER, NEW YORK, A CORPORATION OF NEW YORK.

CELLULOSE-ETHER SOLVENT AND COMPOSITION.

No Drawing. Application filed November 16, 1921. Serial No. 515,646.

*To all whom it may concern:*

Be it known that I, WILLIAM R. WEBB, a citizen of the United States of America, residing at Rochester, in the county of Monroe and State of New York, have invented certain new and useful Improvements in Cellulose-Ether Solvents and Compositions, of which the following is a full, clear and exact specification.

This invention relates to solvents of cellulose ether and to cellulose ether compositions produced by the aid of such solvents. One object of my invention is to provide a solvent which will dissolve relatively large proportions of cellulose ethers so that useful solutions may be obtained for employment in plastic, film-making, and similar arts. Another object of my invention is to provide a cellulose ether composition which may be used in the manufacture of strong, flexible, transparent film on the machines and by the methods now in use.

I have discovered that mixtures of methyl acetate with one or more of the lower monohydroxy aliphatic alcohols containing less than six carbon atoms have a greater solvent action on cellulose ethers than similar weights of such ingredients when employed by themselves. I have also discovered that sufficiently strong or flowable solutions of cellulose ethers, such as water-insoluble ethyl celluloses, may be prepared by the aid of such mixtures.

By way of example, I may mix methyl acetate with one or more of the following alcohols,—methyl alcohol, ethyl alcohol, propyl alcohol, isopropyl alcohol, butyl alcohol, isobutyl alcohols, amyl alcohol, isoamyl alcohol, these being monohydroxy aliphatic alcohols of less than six carbon atoms.

In the preferred form of my invention, I employ from 10 to 90 parts of methyl acetate in a mixture of from 90 to 10 parts of methyl alcohol. The mixture containing 90% of methyl acetate and 10% of methyl alcohol is an excellent solvent for water-insoluble ethyl cellulose, 1 part of such cellulosic compound and 5 parts of the solvent yielding a suitable flowable solution for film manufacture. While I prefer the mixture of methyl acetate with methyl alcohol, because of its greater solvent action, nevertheless, the mixtures of methyl acetate with the other monohydroxy aliphatic alcohols of less than six carbon atoms have greater solvent powers than the sum of the solvent powers of their constituents when taken alone.

In cellulose ether compositions prepared by my new mixture other substances may be incorporated which impart additional suppleness, or incombustibility, or other qualities to the film, such, for example, as triphenyl or tricresyl phosphate, camphor, etc.

The methyl acetate and alcohols are of the commercial type, sufficiently purified for the plastic process in which they are used. In film manufacture they are selected, as usual, to give a dope yielding films having the proper relative freedom from color. The dopes prepared as above described, particularly with reference to the preferred form of my invention, can be used in connection with the usual film-forming apparatus without the necessity of expensive alterations in the latter.

Having thus described my invention, what I claim as new and desire to secure by Letters Patent is:

1. A composition of matter comprising cellulose ether, methyl acetate, and a lower monohydroxy aliphatic alcohol containing less than six carbon atoms.

2. A composition of matter comprising cellulose ether, methyl acetate and methyl alcohol.

3. A viscous flowable composition comprising a water-insoluble ethyl cellulose dissolved in a mixture comprising from 10 to 90 parts of methyl acetate and 90 to 10 parts of methyl alcohol.

4. A viscous flowable film-forming composition, comprising 1 part of cellulose ether in 5 parts of a mixture of methyl acetate and methyl alcohol.

Signed at Rochester, New York, this 10th day of November 1921.

WM. R. WEBB.